US005182506A

United States Patent [19]

Soon-Ho

[11] Patent Number: 5,182,506

[45] Date of Patent: Jan. 26, 1993

[54] POSITION CONTROL DEVICE AND METHOD OF A ROBOT SYSTEM

[75] Inventor: Park Soon-Ho, Suwon, Rep. of Korea

[73] Assignee: Samsung Electronics Co., Ltd., Kyonggi, Rep. of Korea

[21] Appl. No.: 703,741

[22] Filed: May 21, 1991

[30] Foreign Application Priority Data

Apr. 15, 1991 [KR] Rep. of Korea ..................... 91-6014

[51] Int. Cl.[5] .............................................. G05B 23/02

[52] U.S. Cl. ............................ 318/568.1; 318/568.11; 318/568.24; 318/630; 364/191; 364/192

[58] Field of Search ............................... 318/560–646; 364/513, 191, 192; 901/3, 9, 12, 13, 15–20

[56] References Cited

U.S. PATENT DOCUMENTS 4,694,232 9/1987 Suzuki et al. .................. 364/513 X
4,701,686 10/1987 Kishi et al. ......................... 318/632
4,739,238 4/1988 Sugiyama et al. ................. 318/630
4,841,210 6/1989 Kato .............................. 318/568.24
4,887,014 12/1989 Kato .............................. 318/568.11
4,904,911 2/1990 Toyoda et al. ................ 318/568.24
5,008,832 4/1991 Torii et al. ..................... 318/566 X
5,027,044 6/1991 Nishimura et al. ........... 318/568.11
5,049,797 9/1991 Phillips .......................... 318/568.16
5,055,754 10/1991 Kishi et al. ...................... 318/567 X
5,057,995 10/1991 Mizuno et al. ................. 364/513 X

*Primary Examiner*—Paul Ip
*Attorney, Agent, or Firm*—Burns, Doane, Swecker & Mathis

[57] ABSTRACT

A central processing unit (CPU) receives moving distance data from a main CPU to compute the objective position data corresponding to the position to which an object is to be moved. The CPU computes a first deviation value between the objectives position data and the moved distance data of an object to be controlled every sampling time, reads the actual position data and the moved distance data of an object to be controlled every sampling time, reads the actual position data of a motor and computes a second deviation value by subtracting the motor position data previous to a first sampling time from the actual position data of the motor. The CPU also computes a third deviation value by subtracting the motor position data previous to a second sampling time from the motor position data previous to the first sampling time, and subtracts or adds a fourth deviation value, calculated by subtracting the third deviation value from the second deviation value, from or to the motor position data previous to the first sampling time to control the position of the robot system.

1 Claim, 2 Drawing Sheets

MAIN CPU
10
11
CPU
SERVO CONTROL UNIT
14
M
15
RAM
12
ROM
13

Fig. 1
(PRIOR ART)
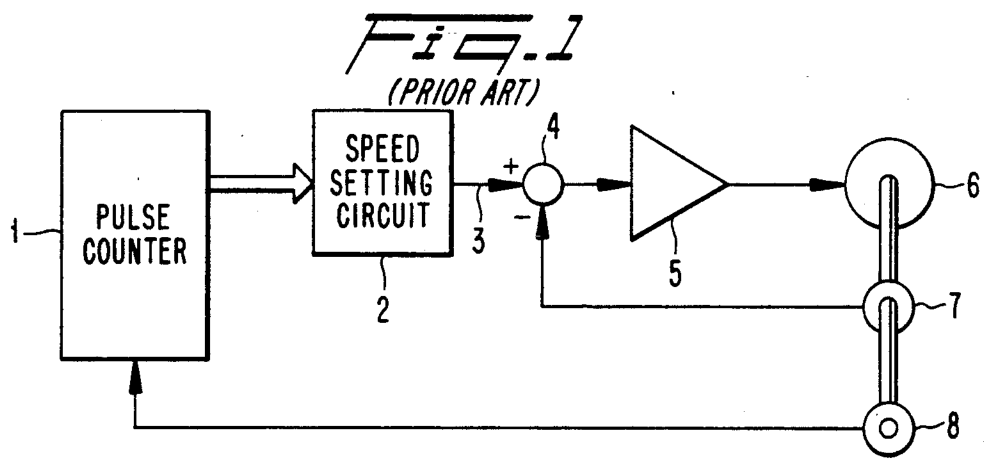
Fig. 2
(PRIOR ART)
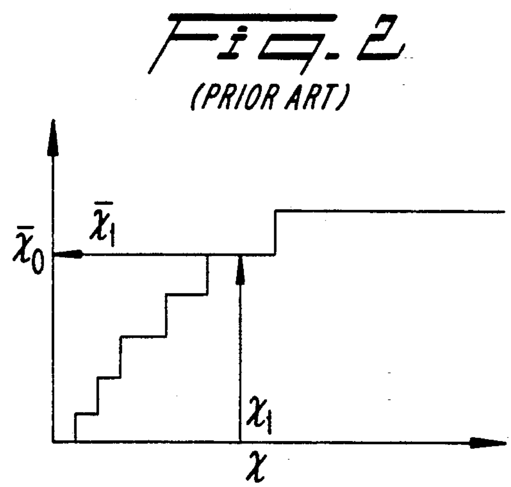
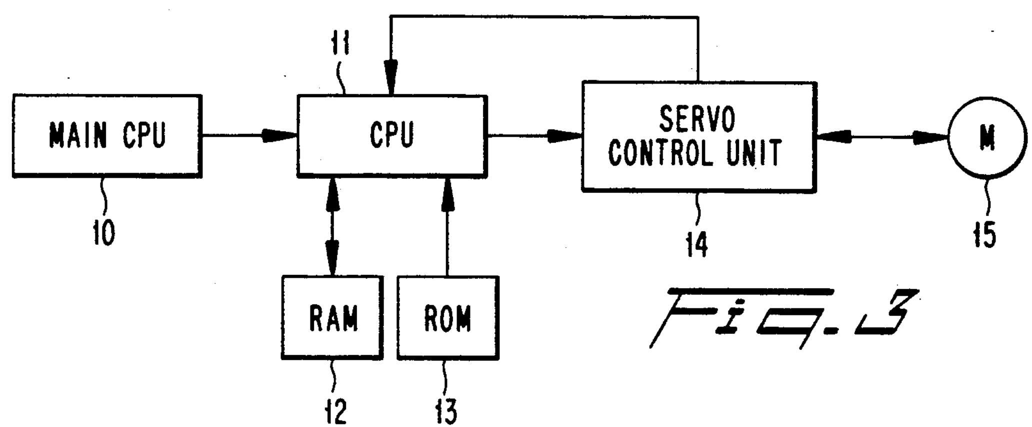
Fig. 3

START
COMPUTE Pd, ΔPd AND STORE INTO RAM
S1
COMPUTE ΔPn AND δPn AFTER READ Pn
S2
|ΔPn| ≤ 3000 PULSES?
S3
NO
YES
S6
ΔPn = ΔPn ± 4096
|δPn| ≤ 256 PULSES?
S4
YES
NO
P'n = Pn −1 ± ΔPd
S5
END

POSITION CONTROL DEVICE AND METHOD OF A ROBOT SYSTEM

BACKGROUND OF THE INVENTION

1. Field of the Invention

The present invention relates to a position control device and method of controlling position of a robot system. The position control device includes a central processing unit (CPU) which receives moving distance data from a main CPU to compute objective position data. The object position data corresponds to a position to which the robot system is to be moved. The CPU also computes a first deviation value between the objective position data and the moved distance data of an object to be controlled every sampling time, reads the actual position data of a motor and computes a second deviation value by subtracting the motor position data previous to 1-sampling time from the actual position data of the motor. The CPU also calculates a third deviation value by subtracting the motor position data previous to 2-sampling time from the motor position data previous to 1-sampling time, and subtracts or adds a fourth deviation value derived by subtracting the third deviation value from the second deviation value, from or to the motor position data previous to 1-sampling time to control the position of the robot system.

2. Description of the Prior Art

A conventional device for positioning a robot system is disclosed, for example, in Japanese patent laid-open publication sho 52-72077, such a positioning device utilizes the digital servo technique that performs feedback of speed and position signals, as shown in FIG. 1 and 2. In FIG. 1, numerical reference number 1 indicates a position counter which counts the direction and distance up to a stop point of an object, not shown, to be position-controlled, which is previously provided with values representative of the distance the object to be controlled is to be moved. The previously set values are counted one by one in accordance with the position pulse signals from a position detector 8. The position detector 8 is mechanically combined to the rotating shaft of a servo motor 6 which drives the object to be controlled and the position-detected pulse signals are produced whenever the object moves by a unit distance.

Also, reference number 2 is a speed setting circuit which inputs the counted output value from the position counter 1 and outputs the analog speed setting signal (reference speed) 3 relative to the distance up to the stop point of the object to be controlled, the speed setting signal 3 having a positive or negative polarity in accordance with the moving direction of the object to be controlled.

Moreover, the rotating shaft of the servo motor is mechanically combined with a speed detector 7 as well. This speed detector 7 detects voltage proportional to the rotating speed of the motor 6.

In FIG. 1, reference number 4 indicates an analog subtractor which compares and subtracts the speed voltage signals, detected by the speed detector 7, with and from the speed setting signal 3 supplied from the speed setting circuit 2. The output signal of the analog subtractor 4 is provided to an analog power amplifier 5, which amplifies the input signal and outputs the amplified signal to the servo motor 6.

With this structure, the servo motor 6, the speed detector 7, the subtractor 4 and the amplifier 5 constitute a speed servo loop so that the speed of the motor 6 may be controlled on the basis of the speed setting signal 3 supplied from the speed setting circuit 2.

Herein, when the speed setting circuit 2 receives the output signal of the position counter 1 and the object to be controlled reaches the point X1 from the stop point (i.e., an origin) on the horizontal axis as shown in FIG. 2, then the speed setting circuit 2 outputs analog signal relative to the speed setting value X01 on the vertical axis representing the speed setting value X0 shown in FIG. 2. The speed setting value X0 is progressively decreased as the object to be controlled approaches the stop point and becomes zero just before the stop point. For this reason, the speed of the servo motor 6 also may be controlled to decrease progressively according to variation of the speed setting value X0. As a result, the object to be controlled can be stopped at the objective position.

According to the conventional positioning device of a robot system as shown in FIG. 1, however, since the speed setting value has a step-shaped character, then the output of the robot system may be unexpectedly varied in initial operating or decelerating and thus positional shift and creep in an output waveform are caused, resulting in a disadvantage that the robot may not be operated optimally.

SUMMARY OF THE INVENTION

Accordingly, the present invention has been made in consideration of the above-mentioned disadvantage and it is an object of the present invention to provide a position control device and method of a robot system which precisely and smoothly reaches the object position even when a variation of the output is caused in operating or decelerating of the speed of the robot system.

In order to achieve the above object, a position control device of a robot system according to the present invention comprises a motor; a main CPU for outputting position control data every sampling time in accordance with interrupt signals to control the motor; a RAM for receiving and storing the position control data of the motor supplied from the main CPU; a ROM storing operating commands concerned with the control of the motor; a central processing unit for receiving the position control data from the main CPU and the RAM and outputting control signals to the motor in accordance with the operating commands stored in the ROM; and, a servo control unit for controlling the motor on the basis of the motor control data and the operating command data output from the CPU and for detecting the actual position data of the motor for feedback to the CPU.

A position control method of a robot system according to the present invention comprises a first step of receiving moving distance data from a main CPU and computing the objective position data Pd to which the object is to be moved and the first deviation data ΔPd between the objective position data Pd and the moved distance data every sampling time by a central processing unit; a second step of reading-in the actual position data Pn of the motor, computing the second deviation data ΔPn subtracted from the motor position data Pn−1 previous to 1-sampling time from the actual position data Pn and the third deviation value ΔPn−1 subtracted from the motor position data Pn−2 previous to 2-sampling time from the motor position data Pn−1 and computing a differential value $\delta Pn$ subtracted from the third deviation value $\Delta Pn-1$ from the second deviation value $\Delta Pn$; a third step of determining whether the second deviation value $\Delta Pn$ corresponds to 1-rotation of the motor; a fourth step of adding or subtracting the number of pulses corresponding to 1-rotation of the motor to or from the second deviation value $\Delta Pn$ when the motor has been rotated once at the third step to obtain the third deviation value $\Delta Pn-1$ and the differential value $\delta Pn$ again and comparing the absolute value of the obtained differential value $\delta Pn$ with the maximum upper limit of noise decision to determine whether noise components are contained in the actual position data, besides, comparing the maximum upper limit of noise decision with the absolute value of the differential value $\delta Pn$ of the position data of the motor when the motor has not been rotated once to determine whether noise components are contained in the actual position data Pn of the motor; and, a fifth step of controlling directly the motor when, at the fourth step, noise components are not contained in the actual position data Pn of the motor, besides, adding or subtracting the objective position deviation value $\Delta Pd$ obtained at the first step to or from the actual position data Pn when noise components are contained in data Pn to thereby control the motor properly.

BRIEF DESCRIPTION OF THE DRAWINGS

FIG. 1 is a block diagram of a positioning device according to the conventional servo control technique;

FIG. 2 is a characteristic view of a speed setting circuit of FIG. 1;

FIG. 3 is a block diagram showing a position control device of a robot system according to the present invention; and, FIG. 4 is a flowchart illustrating a position control method according to the present invention.

DESCRIPTION OF THE PREFERRED EMBODIMENT

Figure 4:
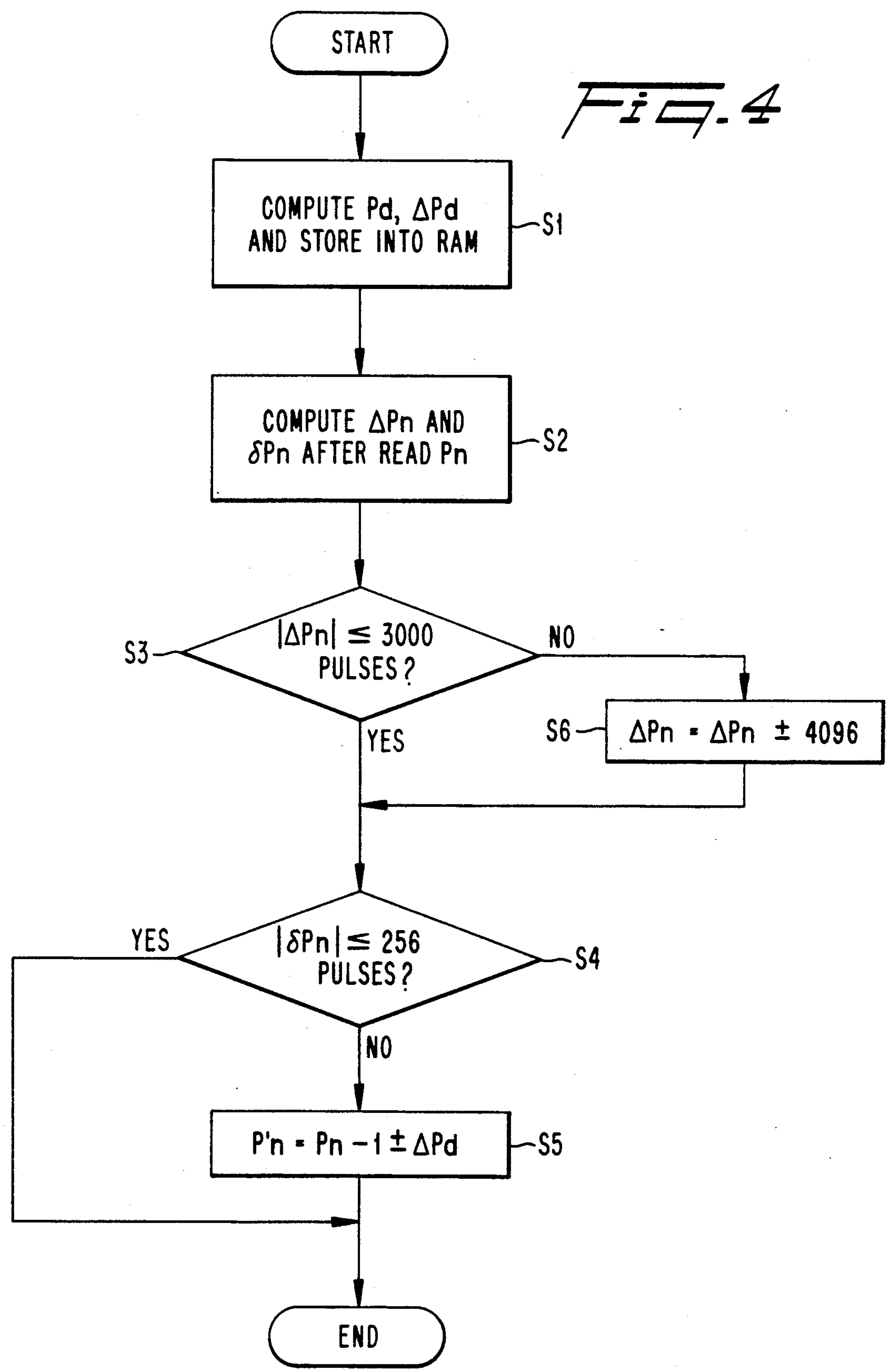

The preferred embodiment of the present invention will be now described in more detail with reference to the accompanying drawings.

FIG. 3 is a block diagram showing a position control device of a robot system according to the present invention and FIG. 4 is a flowchart illustrating a position control method of a robot system in FIG. 3.

Referring to FIG. 3, numerical reference number 10 is a main CPU which outputs the position control data to control the drive of a motor 15 in accordance with interrupt signals produced every sampling time, 12 is a RAM (random access memory) which receives the position control data of the motor 15 through a CPU 11, which will be described below, from main CPU 10 and stores the position control data, 13 is a ROM (read only memory) which stores operating commands relative to the control of the motor 15, 11 is the control processing unit (CPU), 14 is a servo control unit which reads-in the actual position data of the motor 15 and at that time receives analog signal outputs, converted through the CPU 11, of the position control data stored in the RAM 12 and the actual position data of the motor 15 including erroneous state data of the system itself, the analog signal output being from the CPU 11 and the servo-controls unit 14 of the motor 15.

In a position control device of the robot system constructed as described above, the CPU 11 receives position control data for the motor 16 from the main CPU 10 and reads-in the actual position data of the motor 15 from the servo control unit 14. When noise components are included in the actual position data of the motor 15, the CPU 11 compares the position control data of the motor 15 presently read-in with the position control data of the motor 15 supplied from the main CPU 10 and outputs the deviation value to the servo control unit 14.

A position control method of a robot system according to an embodiment of the present invention will be now described with reference to FIG. 4.

Firstly, at a step S1, the CPU 11 receives from the main CPU 10 the moving distance data corresponding to the distance a robot system is to be moved. The CPU 11 computes the objective position Pd corresponding to the position the robot system is to be moved and the deviation value $\Delta Pd$ every sampling time and then stores the objective position value Pd and the deviation value $\Delta Pd$ in the RAM 12. After that, the processing proceeds to a step S2 wherein the CPU 11 reads-in the actual position data Pn of the motor 15 through the servo control unit 14 and subtracts the actual position data $Pn-1$ of the motor 15 previous to 1-sampling time from the read-in actual position data Pn of the motor 15 by utilizing the following equation [1]. At the same time, the CPU 11 subtracts the actual position data $Pn-2$ of the motor 15 previous to 2-sampling time from the actual position data $Pn-1$ by the following equation [2], as a result the deviation values $\Delta Pn$ and $\Delta Pn-1$ can be obtained, respectively:

$$\Delta Pn = Pn - Pn-1 \quad [1]$$

$$\Delta Pn-1 = Pn-1-Pn-2 \quad [2]$$

Wherein, $\Delta Pn$ denotes the deviation value subtracted the actual position data $Pn-1$ of the motor 15 previous 1-sampling time from the actual position data Pn of the motor 15 and $\Delta Pn-1$ denotes the deviation value subtracted the motor position data $Pn-2$ previous to 2-sampling time from the motor position data pn-1 previous to 1-sampling time.

Next, the CPU 11 computes the differential value $\delta Pn$ of the deviation value obtained in the equations [1] and [2] by the following equation [3].

$$\delta Pn = \Delta Pn - \Delta Pn-1 \quad [3]$$

Meanwhile, according to the present invention, it should be noted that the position data has the value of 0–4095 pulses when the motor 15 is rotated once from an origin. For this reason, at a step S3, the CPU 11 determines whether the absolute value of the deviation value of the actual position data Pn of the motor 15, that is, $|\Delta Pn|$ is $\leqq 3000$ pulses to determine whether the motor 15 has performed an initial rotation. If the result is YES, that is, if the motor 15 has not rotated once, then the processing proceeds to a step S4. At the step S4, the CPU 11 determines whether the absolute value $|\delta Pn|$ of the deviation value $\Delta Pn$ of the actual position data Pn' obtained at the step S1 is less than the maximum upper limit, 256 pulses, of noise decision. If the result is NO, that is, if noise components are included in the actual position data of the motor 15, the processing proceeds to a step S5. At the step S5, the CPU 11 subtracts or adds the deviation value $\Delta Pd$ obtained at the step S1 from or to the motor position data $Pn-1$ previous to 1-sampling time, determines the subtracted or added value Pn as the presumed actual position of the motor 15 and then ends the control of the motor 15, that is, the control of the robot system.

Alternatively, when the absolute value $|\delta Pn|$ of the differential value $\delta Pn$ of the deviation value $\Delta Pn$ differentiated at the step S1 is less than 256 pulses, that is, if YES, the CPU 11 determines as a normal state that noise components are not included in the actual position data of the motor 15 read-in from the servo control unit 14 and ends the control of the motor 15, that is, the control of the robot system.

Meanwhile, if the result is NO at the step S3, that is, if the motor 15 has been rotated once, the processing proceeds to a step S6. At the step S6, the CPU 11 subtracts or adds the number of pulses, 4069, corresponding to 1-rotation of the motor 15 from or to the deviation value subtracted the actual position data $Pn-1$ of the motor 15 previous to 1-sampling time from the actual motor position data $Pn-1$ thereby newly obtaining the deviation value $\Delta Pn$ and the differential value $\delta Pn$ thereof. After that, the processing proceeds to the step S4 where the CPU 11 repeatedly performs operations following the step S4 in the same manner as described above. Herein, the reason for subtracting or adding 4096 pulses corresponding to 1-rotation of the motor from or to the position deviation value $\Delta Pn$ is for obtaining the actually moved distance of the motor 15, that is, the deviation value $\Delta Pn$ of the position data.

In the present invention, it should be noted that the number of pulses, 3000, are presumptively calculated from the condition that the number of pulses produced in 1-rotating of the motor are set 4096 pulses in the present invention and the maximum number of pulses movable of the motor 15 each 2 ms thus are 500 pulses, that is $4096-500=3000$. Also, numerical reference 256 means the maximum upper limit of noise decision obtained by experiments.

The position control system of the robot system of the present invention, as described above, comprises a main CPU 10, a CPU 11 and a servo control unit 14, which computes the deviation value $\Delta Pn$, subtracts the actual position data of the motor 15 previous to 1-sampling time from the actual position data of the motor 15, and the deviation value subtracted the actual position data of the motor 15 previous to 2-sampling time from the actual position data of the motor 15 previous to 1-sampling time, determines whether the motor has been rotated once on the basis of the absolute value of $\Delta Pn$ and determines whether noise components are contained in the position data of the motor 15 by utilizing the maximum upper limit of noise decision to thereby control the motor 15. Accordingly, with respect to the present invention, it achieves satisfactory effects in that the robot system precisely and smoothly reaches an objective position without a positional shift phenomenon and an unexpected operation occurring because of noise data or sudden variations of the output waveform in operating or decelerating of the robot system.

The present invention has been described with respect to a specific embodiment shown in the accompanying drawings. However, other embodiments based on the spirit and scope of the present invention should be obvious to those of ordinary skill in the art.

What is claimed is:

1. A position control method of a robot system, comprising the steps of:

receiving moving distance data from a main CPU and computing objective position data corresponding to a position to which an object is to be moved and a first deviation data between the objective position data and actual distance data every sampling time by a central processing unit;

reading-in the actual position data of the motor, computing a second deviation value by subtracting a first motor position data of a previous, first sampling time from the actual position data and a third deviation value by subtracting a second motor position data of a previous, second sampling time from the first motor position data and computing a differential value by subtracting the third deviation value from the second deviation value;

determining whether the second deviation value corresponds to one rotation of the motor;

adding or subtracting the number of pulses corresponding one rotation of the motor to or from the second deviation value when the motor has been rotated once in the determining step to obtain the third deviation value and the differential value again and comparing the absolute value of the obtained differential value with the maximum upper limit of noise decision to determine whether noise components are contained in the actual position data, and, comparing the maximum upper limit of noise decision with the absolute value of the differential value of the position data of the motor when the motor has not been rotated once to determine whether noise components are contained in the actual position data of the motor; and, controlling directly the motor when, at the adding or subtracting step, noise components are not contained in the actual position data of the motor, and, adding or subtracting an objective position deviation value obtained to or from the actual position data when noise components are contained in the actual position data to thereby control the motor.

* * * * *